(12) United States Patent
Dong et al.

(10) Patent No.: US 11,953,680 B2
(45) Date of Patent: Apr. 9, 2024

(54) SEE-THROUGH DISPLAY DEVICE AND MANUFACTURING METHOD THEREOF

(71) Applicant: BOE Technology Group Co., Ltd., Beijing (CN)

(72) Inventors: Liwen Dong, Beijing (CN); Feng Zhang, Beijing (CN); Wenqu Liu, Beijing (CN); Zhijun Lv, Beijing (CN); Zhao Cui, Beijing (CN); Detian Meng, Beijing (CN); Libo Wang, Beijing (CN); Xiaoxin Song, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 50 days.

(21) Appl. No.: 17/311,477

(22) PCT Filed: Dec. 29, 2020

(86) PCT No.: PCT/CN2020/140581
§ 371 (c)(1),
(2) Date: Jun. 7, 2021

(87) PCT Pub. No.: WO2021/169564
PCT Pub. Date: Sep. 2, 2021

(65) Prior Publication Data
US 2023/0359025 A1    Nov. 9, 2023

(30) Foreign Application Priority Data

Feb. 24, 2020 (CN) .......................... 202010111979.5

(51) Int. Cl.
*G02B 27/01* (2006.01)
(52) U.S. Cl.
CPC .. *G02B 27/0101* (2013.01); *G02B 2027/0118* (2013.01)

(58) Field of Classification Search
CPC ................ G02B 27/0101; G02B 2027/0118
(Continued)

(56) References Cited

U.S. PATENT DOCUMENTS

| 8,421,959 B2 | 4/2013 | Yoon et al. |
| 2009/0290096 A1 | 11/2009 | Yoon et al. |

(Continued)

FOREIGN PATENT DOCUMENTS

| CN | 103700693 A | 4/2014 |
| CN | 107219685 A | 9/2017 |

(Continued)

OTHER PUBLICATIONS

PCT/CN2020/140581 International search report and written opinion.
CN202010111979.5 First Office Action.

*Primary Examiner* — Jerry L Brooks
(74) *Attorney, Agent, or Firm* — IPro, PLLC

(57) ABSTRACT

This disclosure relates to a see-through display device, including: a collimated light source assembly, configured to form collimated light and control a light emitting direction; a first light extraction layer, configured to extract, in a collimated manner, the light ray transmitted inside the light guide plate through a light extraction outlet; an extinction layer and a second light extraction layer, wherein the extinction layer includes a light guide region and a light absorption region which are arranged alternately, and the second light extraction layer includes multiple light extraction inlets; a reflecting layer, arranged on a side, close to the light guide plate, of the second light extraction layer and configured to reflect the collimated light extracted from the light extraction outlet to the light guide plate; and a liquid crystal dimming layer. This disclosure further relates to a manufacturing method of the see-through display device.

10 Claims, 4 Drawing Sheets

(58) Field of Classification Search
USPC .......................................................... 359/360
See application file for complete search history.

(56) References Cited

U.S. PATENT DOCUMENTS

| | | |
|---|---|---|
| 2019/0033656 A1 | 1/2019 | Tan et al. |
| 2020/0285104 A1 | 9/2020 | Meng et al. |
| 2020/0326584 A1 | 10/2020 | Tan et al. |
| 2020/0371279 A1 | 11/2020 | Meng et al. |
| 2020/0379157 A1 | 12/2020 | Meng et al. |
| 2021/0018674 A1 | 1/2021 | Tan et al. |
| 2021/0072593 A1 | 3/2021 | Meng et al. |
| 2021/0132443 A1 | 5/2021 | Li |
| 2021/0141139 A1 | 5/2021 | Meng et al. |
| 2021/0255384 A1 | 8/2021 | Meng et al. |

FOREIGN PATENT DOCUMENTS

| | | | |
|---|---|---|---|
| CN | 108646338 | A | 10/2018 |
| CN | 108761946 | A | 11/2018 |
| CN | 109031736 | A | 12/2018 |
| CN | 109061948 | A | 12/2018 |
| CN | 109212834 | A | 1/2019 |
| CN | 109239965 | A | 1/2019 |
| CN | 109541850 | A | 3/2019 |
| CN | 109683388 | A | 4/2019 |
| CN | 109799568 | A | 5/2019 |
| CN | 110244492 | A | 9/2019 |
| CN | 110389469 | A | 10/2019 |
| CN | 209496217 | U | 10/2019 |
| CN | 110579900 | A | 12/2019 |
| CN | 111240091 | A | 6/2020 |
| IN | 110673388 | A | 1/2020 |
| WO | 2019200917 | A1 | 10/2019 |

# SEE-THROUGH DISPLAY DEVICE AND MANUFACTURING METHOD THEREOF

CROSS-REFERENCE TO RELATED APPLICATIONS

The present application is a U.S. national phase application of a PCT Application No. PCT/CN2020/140581 filed on Dec. 29, 2020, which claims a priority to Chinese Patent Application No. 202010111979.5 filed in China on Feb. 24, 2020, disclosures of which are incorporated herein by reference in their entireties.

TECHNICAL FIELD

The present disclosure relates to the field of display product manufacturing technologies, and more particularly, to a see-through display device and a manufacturing method thereof.

BACKGROUND

In recent years, more and more manufacturers are devoted to developing see-through display products. A see-through display device is light and thin, easy to carry, can support three dimensional (3D) display technology, and has low energy consumption which is environment-friendly and energy-saving. In addition, its biggest advantage is that, thanks to the transparent screen, we will be able to "grab", through the screen, contents in the screen, thus enjoying a brand new human-computer interaction experience.

D-view display technology: a transparent light guide plate is used, a light extraction port is formed through nano-imprinting, and then a liquid crystal prism is used to achieve light scattering. A display area and a non-display area are reserved in the display design, and ambient light is introduced to the non-display area to achieve a see-through display. In order to improve the display contrast and the light efficiency of the device, the D-View display technology is improved, that is, collimated light from a light outlet is reflected by a reflecting inclined surface to a lower substrate to exit. Different from the above D-View display technology, a feature of this improved technology is that the emitted light is reflected collimated light, thus the device has higher light efficiency and higher contrast. However, a BM (light shielding) material does not completely absorb incident light under the LO condition, but has a reflectance of 5%, that is, there is still light leakage caused by the reflection of the BM material in a dark state, which eventually reduces the contrast of the display device. Moreover, an irradiation range of the refracted light in the dark state overlaps an irradiation range of the incident light in a bright state, which eventually causes a small part of the refracted light to irradiate the reflecting inclined surface in the dark state, resulting in light leakage in the dark state. In order to block the leaked light, it is necessary to manufacture a BM light blocking strip on the lower substrate, thereby increasing the manufacturing cost.

SUMMARY

In order to solve the above technical problems, the present disclosure provides a see-through display device and a manufacturing method thereof, to solve the problem that a see-through display in a dark state requires not only a light shielding layer of an upper substrate for light absorption, but also a light shielding strip on a lower substrate for preventing light leakage, which results in the increase of the manufacturing cost.

In order to achieve the above objectives, the present disclosure adopts the following technical solution: a see-through display device, including a light guide plate and an array substrate which are oppositely arranged, and a liquid crystal dimming layer arranged between the light guide plate and the array substrate. The see-through display device further includes:

a collimated light source assembly arranged on a light incident surface of the light guide plate, and configured to form collimated light and control a light emitting direction such that a light ray incident into the light guide plate is transmitted in a total reflection manner;

a first light extraction layer arranged on a first surface, adjacent to the light incident surface, of the light guide plate, wherein the first light extraction layer is provided with a plurality of light extraction outlets, and is configured to extract, in a collimated manner, the light ray transmitted inside the light guide plate through the light extraction outlets;

an extinction layer and a second light extraction layer which are sequentially superposed on a surface, facing the first surface of the light guide plate, of the array substrate along a direction towards the light guide plate, wherein the extinction layer includes a light guide region and a light absorption region which are arranged alternately, the second light extraction layer includes a plurality of light extraction inlets, and an orthographic projection of the light extraction inlets onto the extinction layer is located in the light guide region such that the light ray entering from the light extraction inlets is incident to the light guide region and is transmitted to the light absorption region in a total reflection manner within the light guide region; and a reflecting layer arranged on a side, close to the light guide plate, of the second light extraction layer, including a plurality of reflecting portions each located between two adjacent light extraction inlets, and configured to reflect the collimated light extracted from the light extraction outlets to the light guide plate such that the light exits from a second surface of the light guide plate, wherein the second surface is arranged opposite to the first surface;

wherein the liquid crystal dimming layer includes a first electrode and a second electrode which are oppositely arranged, and a liquid crystal layer arranged between the first electrode and the second electrode; in a first state, a voltage is applied to the first electrode and the second electrode, and the light ray exiting from the light extraction outlets is deflected by the liquid crystal layer and is incident to the reflecting layer; and in a second state, no voltage is applied to the first electrode and the second electrode, and the light ray exiting from the light extraction outlets passes through the liquid crystal layer and then enters the extinction layer from the light extraction inlets.

Optionally, a reflecting surface, facing the light guide plate, of each reflecting portion is an inclined surface, and an angle between the inclined surface and the first surface of the light guide plate is an acute angle.

Optionally, each reflecting portion includes:

a wedge-shaped connecting piece formed by photoresist, wherein the wedge-shaped connecting piece includes a first connecting surface connected to the second light extraction layer and a second connecting surface adjacent to the first connecting surface, and the second connecting surface is the inclined surface forming the acute angle with the first surface of the light guide plate; and a metal reflecting piece arranged on the second connecting surface, wherein a surface, away from the second connecting surface, of the metal reflecting piece is parallel to the second connecting surface.

Optionally, a surface, facing the array substrate, of the first light extraction layer is coated with a scattering particle layer.

Optionally, the scattering particle layer includes a plurality of scattering particle portions each located between two adjacent light extraction outlets, the plurality of scattering particle portions correspond to the plurality of reflecting portions in a one-to-one manner, and each scattering particle portion is located in a transmission path of a light ray reflected by a corresponding reflecting portion.

Optionally, a refractive index of the second light extraction layer is less than that of the light guide region of the extinction layer.

Optionally, the light guide region of the extinction layer is made of a material with a same refractive index as that of the light guide plate.

Optionally, a refractive index of the first light extraction layer is less than that of the light guide plate.

Optionally, the collimated light source assembly includes a collimating lampshade and a light source located in the collimating lampshade, wherein the collimating lampshade includes a light emitting surface connected to and parallel to the light incident surface of the light guide plate and a curved reflecting surface arranged opposite to the light emitting surface, and the light source is located at a focal point of the curved reflecting surface.

The present disclosure further provides a manufacturing method of the above see-through display device, including forming a reflecting layer, wherein the forming the reflecting layer specifically includes:

performing multiple exposures to form a stepped surface and then performing a development process by using a mask, to form a plurality of wedge-shaped connecting pieces; and depositing a metal layer on a second connecting surface of each wedge-shaped connecting piece through a magnetron sputtering process, to form a metal connecting piece.

Beneficial effects of the present disclosure are as follows: the extinction layer and the second light extraction layer are provided, wherein the extinction layer includes the light guide region and the light absorption region which are arranged alternately, and the second light extraction layer includes the plurality of light extraction inlets; in a dark state, the light ray entering from the light extraction inlets is incident to the light guide region and is transmitted to the light absorption region in a total reflection manner within the light guide region so as to prevent light leakage, and in a bright state, collimated light extracted from the light extraction outlets of the light guide plate is reflected back to the light guide plate by the reflecting layer and exits from the second surface of the light guide plate, thus improving the contrast and reducing the cost.

DETAILED DESCRIPTION

Figure 1:
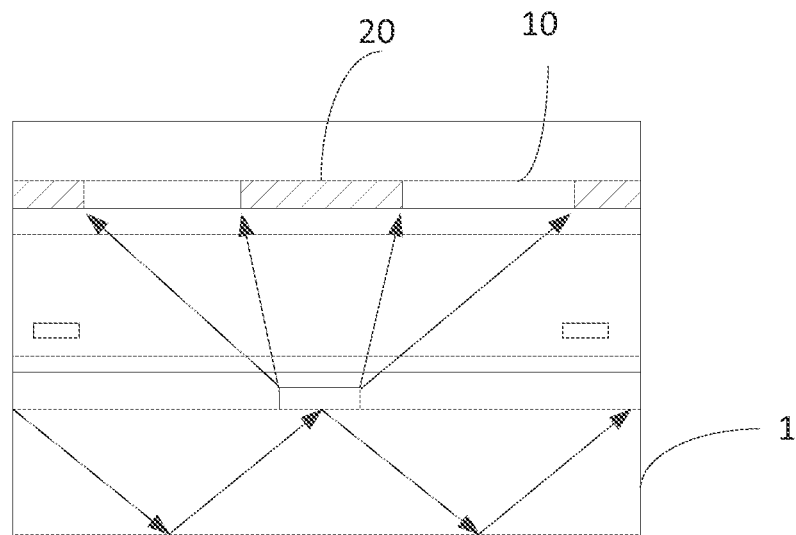
FIG. 1 shows a first schematic structural diagram of a see-through display device of a related art.

To further clarify the objectives, features and advantages of the embodiments of the present disclosure, the following describes clearly and completely the technical solutions according to the embodiments of the present disclosure with reference to the accompanying drawings in the embodiments of the present disclosure. It is apparent the embodiments in the following description are merely a part rather than all of the embodiments of the present disclosure. All other embodiments obtained by a person of ordinary skill in the art based on the embodiments of the present disclosure without creative efforts shall fall within the scope of the present disclosure.

In the description of the present disclosure, it should be understood that the orientation or positional relationship indicated by the terms "center", "upper", "lower", "left", "right", "vertical", "horizontal", "inner", "outer", and the like is based on the orientation or positional relationship shown in the drawings, and is merely for convenience of describing the present disclosure and simplifying the description, but is not intended to indicate or imply that the referenced device or element must have a particular orientation, be constructed and operated in a particular orientation, and thus should not be construed as limiting the present disclosure. In addition, the terms "first", "second", "third" and the like are used for descriptive purposes only and are not to be construed as indicating or implying relative importance.

Figure 2:
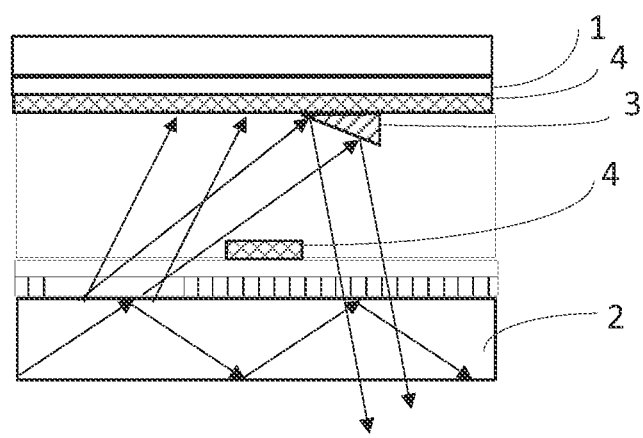
FIG. 2 shows a second schematic structural diagram of a see-through display device of a related art.

As shown in FIG. 1, in a related D-View display technology, a transparent light guide plate 1 is used, a light extraction port is formed through nano-imprinting, and then a liquid crystal prism is used to achieve light scattering. A display area 10 and a non-display area 20 are reserved in the display design, ambient light is introduced to the non-display area 20 to achieve a see-through display. In order to improve the display contrast and the light efficiency of the device, the D-View display technology is improved. As shown in FIG. 2, in a dark state, collimated light exiting from a light outlet is deflected and refracted by a liquid crystal between an upper substrate 1 and a lower substrate 2, and then absorbed by a (BM) light shielding layer 4 arranged on the upper substrate 1; and in a bright state, the collimated light exiting from the light outlet is reflected by a reflecting inclined surface of a reflecting prism 3 to the lower substrate 2 to exit. Different from the above D-View display technology, a feature of this improved technology is that the emitted light is reflected collimated light, thus the light efficiency of the device is higher, and the contrast is higher.

However, the light shielding layer 4 arranged on the upper substrate 1 does not completely absorb the incident light in the dark state, but has the reflectance of 5%, that is, there is still light leakage caused by the reflection of the light shielding layer 4 arranged on the upper substrate 1 in the dark state, which eventually reduces the display contrast. At the same time, illumination ranges of the refracted light in the dark state and the incident light in a bright state overlap, which eventually causes a small part of the refracted light to irradiate the reflecting inclined surface of the reflecting prism 3 in the dark state, resulting in light leakage in the dark state. In order to block the leaked light, it is further necessary to manufacture a BM light shielding layer 4 on the lower substrate 2, thereby increasing the manufacturing cost.

In order to solve the problem that in the bright state, the collimated light is reflected by the reflecting surface to the lower substrate to exit, and in the dark state, not only light is absorbed by the light shielding layer on the upper substrate, but also the light leakage is prevented through the arrangement of the light shielding layer on the lower substrate, which results in the decrease of the aperture ratio and increase of the manufacturing cost, the present disclosure provides a see-through display device provided with an extinction layer and a second light extracting layer, wherein the extinction layer includes light guide regions and light absorption regions which are arranged alternately; the second light extraction layer includes a plurality of light extraction inlets; in a dark state, the light ray entering from the light extraction inlets is incident to the light guide region and is transmitted to the light absorption region in a total reflection manner within the light guide region so as to prevent light leakage, and in a bright state, the collimated light extracted from the light extraction outlets of the light guide plate is reflected by the reflecting layer back to the light guide plate and exits from a second surface of the light guide plate, thus improving the contrast and reducing the cost.

Figure 3:
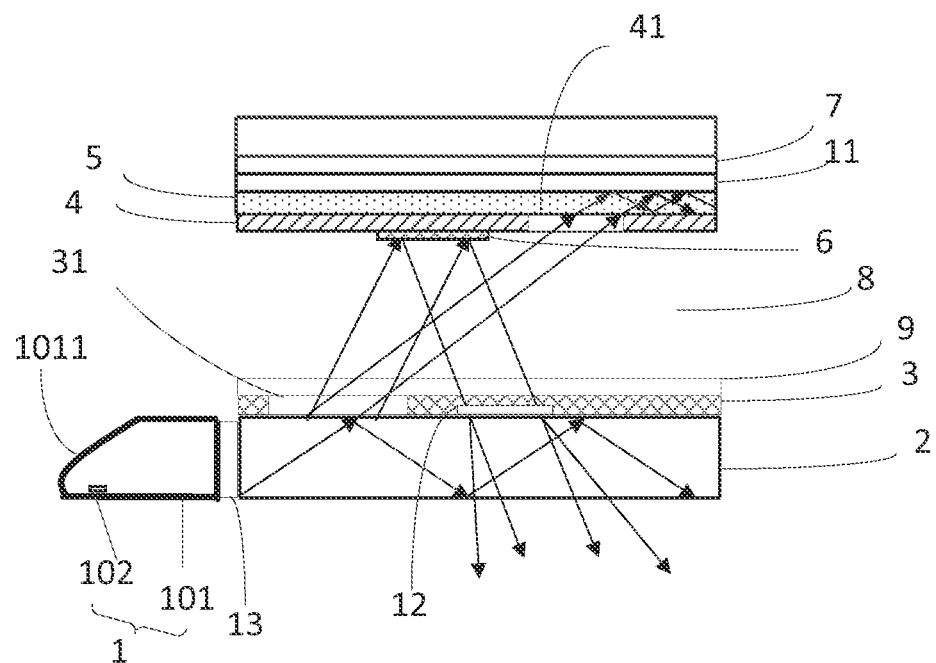
FIG. 3 shows a first schematic structural diagram of a see-through display device according to an embodiment of the present disclosure.

Specifically, as shown in FIG. 3, the present embodiment provides a see-through display device, including a light guide plate 2 and an array substrate which are oppositely arranged, and a liquid crystal dimming layer arranged between the light guide plate 2 and the array substrate, and further including:

a collimated light source 101 assembly 1, arranged on a light incident surface of the light guide plate 2, and configured to form collimated light and control a light emitting direction such that a light ray incident into the light guide plate 2 is transmitted in a total reflection manner;

a first light extraction layer 3, arranged on a first surface, adjacent to the light incident surface, of the light guide plate 2, wherein the first light extraction layer 3 is provided with a plurality of light extraction outlets 31 and is configured to extract, in a collimated manner, the light ray transmitted inside the light guide plate 2 from the light extraction outlets 31;

an extinction layer 5 and a second light extraction layer 4 which are sequentially superposed on a surface, facing the first surface of the light guide plate 2, of the array substrate along a direction towards the light guide plate 2, wherein the extinction layer 5 includes a light guide region 51 and a light absorption region 52 which are arranged alternately, and the second light extraction layer 4 includes a plurality of light extraction inlets 41, an orthographic projection of the light extraction inlet 41 onto the extinction layer 5 is located within the light guide region 51 such that the light ray entering from the light extraction inlets 41 is incident to the light guide region 51 and is transmitted to the light absorption region 52 in a total reflection manner within the light guide region 51; and a reflecting layer, arranged on a side, close to the light guide plate 2, of the second light extraction layer 4, and including a plurality of reflecting portions 6 each located between two adjacent light extraction inlets 41 and configured to reflect the collimated light extracted from the light extraction outlets 31 to the light guide plate 2 so as to exit from a second surface of the light guide plate 2, wherein the second face is arranged opposite to the first surface;

wherein the liquid crystal dimming layer includes a first electrode 9, a second electrode 11, and a liquid crystal layer 8 arranged between the first electrode 9 and the second electrode 11; in a first state, a voltage is applied to the first electrode 9 and the second electrode 11, and the light ray exiting from the light extraction outlets 31 is deflected by the liquid crystal layer 8 and incident to the reflecting layer; and in a second state, no voltage is applied to the first electrode 9 and the second electrode 11, and the light ray exiting from the light extraction outlets 31 passes through the liquid crystal layer 8 and then enters the extinction layer 5 from the light extraction inlets 41.

Through the above technical solutions, in a bright state, the collimated light transmitted inside the light guide plate 2 is extracted from the light extraction outlets 31 of the first light extraction layer 3, is refracted by the liquid crystal (n=1.8) in a rotated state, is directly reflected back to the light guide plate 2 by the reflecting layer back, and exits from the second surface of the light guide plate 2; and in a dark state, the liquid crystal is not rotated, and the collimated light transmitted inside the light guide plate 2 is extracted from the light extraction outlets 31 of the first light extraction layer 3, is directly incident to the light extraction inlets 41 of the second light extraction layer 4, and is totally reflected in the light guide region 51 of the extinction layer 5, and may not be reflected to the light guide plate 2 to cause light leakage. In addition, the light ray transmitted within the light guide region 51 is absorbed by the light absorption region 52, and is prevented from leaking out from an adjacent light extraction inlet 41, so the light is completely locked in the extinction layer 5 in the dark state, the light leakage is effectively prevented, and no light shielding layer is needed to be arranged on the light guide plate 2. As a result, the cost is reduced, the aperture ratio is increased, and high contrast is achieved.

There may be various specific structural forms of the reflecting portion 6; the reflecting surface of the reflecting portion 6 may be arranged parallel to the first surface of the light guide plate 2; or the reflecting surface of the reflecting portion 6 may be arranged to form an angle with the first surface of the light guide plate 2; and in order to obtain a different visual angle, the reflecting surface of the reflecting portion 6 may be manufactured into an inclined surface at a different angle.

In order to ensure the reflection, by the reflecting portions 6, of the collimated light exiting from the light extraction outlets 31, in a specific implementation of the present embodiment, the reflecting surface, facing the light guide plate 2, of each reflecting portion 6 is an inclined surface, and an angle between the inclined surface and the first surface of the light guide plate 2 is an acute angle.

Figure 4:
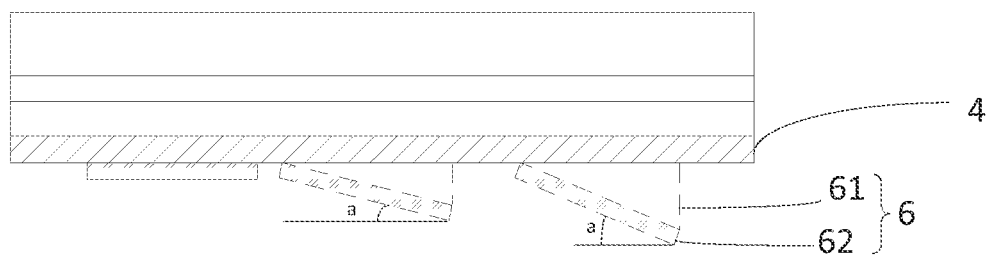
FIG. 4 shows a schematic structural diagram of a reflecting layer according to an embodiment of the present disclosure.

FIG. 4 shows three states of the reflecting portion 6, wherein from left to right, the reflecting portion 6 in a first state is provided with a reflecting surface that is a planar structure parallel to the first surface of the light guide plate 2, the reflecting portion 6 in a second state is provided with a reflecting surface that is an inclined surface, and an angle (first angle) between the reflecting surface and the first surface of the light guide plate 2 is an acute angle, and the reflecting portion 6 in a third state is provided with a reflecting surface that is an inclined surface, an angle (second angle) between the reflecting surface and the first surface of the light guide plate 2 is an acute angle, and the second angle between the reflecting surface of the reflecting portion 6 in the third state and the first surface of the light guide plate 2 is less than the first angle between the reflecting surface of the reflecting portion 6 in the second state and the first surface of the light guide plate 2.

It should be noted that, in order to describe the three states of the reflecting portion 6 and facilitate the comparison of the inclination angles of the inclined surfaces of the reflecting portions 6 in the three states, the reflecting portions 6 in the three states are shown in the single drawing. In practice, both the structures of the plurality of reflecting portions 6 and the inclination angles of the reflecting surfaces in one see-through display device are the same, and each reflecting portion 6 is located between two adjacent light extraction inlets 41, referring to FIG. 5.

In a specific implementation of the present embodiment, the reflecting surface of each reflecting portion 6 is parallel to the first surface of the light guide plate 2, and in this case, the reflecting portion 6 may be made of metal and deposited on the second light extraction layer 4 through a magnetron sputtering process.

In a specific implementation of the present embodiment, the reflecting surface of the reflecting portion 6 is an inclined surface, and in this case, an inclined surface structure cannot be formed using only metal, therefore each reflecting portion 6 in the present implementation includes:

a wedge-shaped connecting piece 61 formed by photoresist, wherein the wedge-shaped connecting piece 61 includes a first connecting surface connected to the second light extraction layer 4 and a second connecting surface adjacent to the first connecting face, and the second connecting surface is an inclined surface forming an acute angle with the first surface of the light guide plate 2; and a metal reflecting piece 62 provided on the second connecting surface, wherein a face, away from the second connecting surface, of the metal reflecting piece 62 is parallel to the second connecting surface.

It should be noted that, in order to control a light emitting direction of the light ray reflected by the reflecting layer, regardless of whether the reflecting surface is arranged parallel to the first surface of the light guide plate 2 or is arranged to form an acute angle with the first surface of the light guide plate 2, the reflecting surface of the reflecting portion 6 is a smooth plane (smooth and flat structure).

In the present embodiment, a surface, facing the array substrate, of the first light extraction layer 3 is coated with a scattering particle layer.

Through the arrangement of the scattering particle layer, the collimated light reflected back by the reflecting layer to the light guide plate 2 is scattered, so that a larger viewing angle can be obtained.

In present embodiment, the scattering particle layer includes a plurality of scattering particle portions 12 each located between two adjacent light extraction outlets 31, wherein the plurality of scattering particle portions 12 correspond to the plurality of reflecting portions 6 in a one-to-one manner, and each scattering particle portion 12 is located in a transmission path of a light ray reflected by a corresponding reflecting portion 6.

Figure 5:
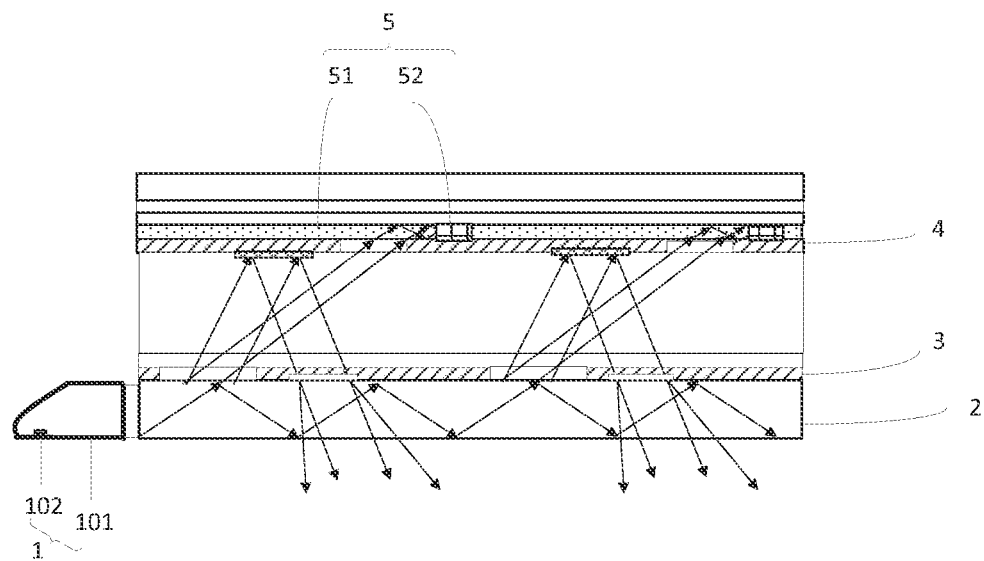
FIG. 5 shows a second schematic structural diagram of a see-through display device according to an embodiment of the present disclosure.
Figure 6:
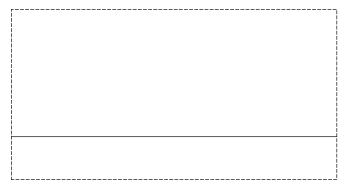
FIG. 6 shows a schematic diagram depicting a state after gluing is performed in a process of manufacturing a wedge-shaped connecting piece according to an embodiment of the present disclosure.
Figure 7:
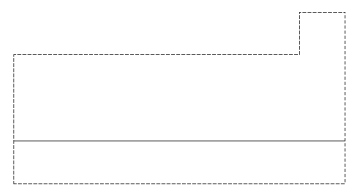
FIG. 7 shows a schematic diagram depicting a state after a first exposure is performed in a process of manufacturing a wedge-shaped connecting piece according to an embodiment of the present disclosure.
Figure 8:
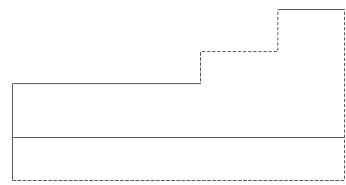
FIG. 8 shows a schematic diagram depicting a state after a second exposure is performed in a process of manufacturing a wedge-shaped connecting piece according to an embodiment of the present disclosure.
Figure 9:
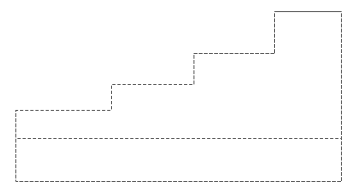
FIG. 9 shows a schematic diagram depicting a state after a third exposure is performed in a process of manufacturing a wedge-shaped connecting piece according to an embodiment of the present disclosure.
Figure 10:
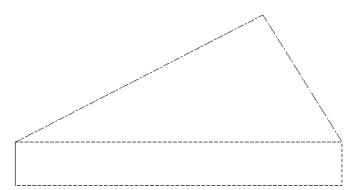
FIG. 10 shows a schematic diagram of a wedge-shaped connecting piece formed after a development process according to an embodiment of the present disclosure.

A direction of the light ray reflected by the reflecting layer is determined, namely, a path of the light ray is determined, and then the scattering particle portion 12 can be provided on a region, in a transmission path of the light ray, on the first surface of the light guide plate 2, which reduces the cost compared to completely covering the first surface of the light guide plate 2 with the scattering particle layer, as shown in FIG. 5.

In present embodiment, the refractive index of the second light extraction layer 4 is less than that of the light guide region 51 of the extinction layer 5.

Through the above solution, it can be ensured that the light ray entering the light guide plate 2 can be transmitted in a total reflection manner within the light guide region 51, to prevent light leakage.

In present embodiment, the light guide region 51 of the extinction layer 5 is made of a material with the same refractive index as that of the light guide plate 2.

Through the above solution, it is convenient to control an incident angle of the light ray entering the light guide region 51 from the light extraction inlets 41, thereby effectively ensuring that the light ray entering the light guide region 51 is transmitted in a total reflection manner within the light guide region 51, to prevent light leakage.

In a specific implementation of the present embodiment, the light guide region 51 is made of SiO2, but is not limited thereto.

In present embodiment, the refractive index of the first light extraction layer 3 is less than that of the light guide plate 2.

Through the above solution, it is ensured that the light ray entering the light guide plate 2 is transmitted in a total reflection manner within the light guide plate 2.

There may be various specific structural forms of the collimated light source 101 assembly 1, as long as it can be realized that the collimated light is incident to the light guide plate 2 at a preset angle. In the present embodiment, the collimated light source 101 assembly 1 includes a collimating lampshade 102 and a light source 101 located in the collimating lampshade 102, wherein the collimating lampshade 102 includes a light emitting surface connected to and parallel to the light incident surface of the light guide plate 2, and a curved reflecting surface 1011 arranged opposite to the light emitting surface, and the light source 101 is located at a focal point of the curved reflecting surface 1011.

In a specific implementation of the present embodiment, the curved reflecting surface 1011 is a spherical surface or parabolic surface, and a concave surface of the spherical surface or parabolic surface faces the light source 101.

In present embodiment, the light source 101 is a point light source 101 such as an LED.

The light source 101 may be a light source producing monochromatic light (e.g. white light, red light, green light, or blue light) or mixed-color light, and the specific color may be set as per actual needs.

In present embodiment, a polarizer 13 is provided between the light emitting surface of the collimating lampshade 102 and the light incident surface of the light guide plate 2.

Without the polarizer, 50% of the light entering the liquid crystal dimming layer will not be controlled by liquid crystal conduction and become stray light, thereby reducing the display contrast. In present embodiment, through the arrangement of the polarizer, the light entering the light guide plate 2 becomes polarized light, thereby facilitating the regulation of the liquid crystal dimming layer.

The present embodiment further provides a manufacturing method of the above see-through display device, including forming a reflecting layer, wherein the forming the reflecting layer specifically includes:

performing multiple exposures to form a stepped surface and then performing a development process by using a mask, to form a plurality of wedge-shaped connecting pieces 61, wherein FIG. 6 to FIG. 10 are schematic state diagrams of the wedge-shaped connecting piece 61 formed through three exposures and a development process; and depositing a metal layer on a second connecting surface of each of the wedge-shaped connecting pieces 61 through a magnetron sputtering process, to form a metal reflecting piece 62.

While the foregoing is directed to optional embodiments of the present disclosure, it should be noted that those of ordinary skill in the art may further make various improvements and modifications without departing from the principle of the present disclosure, and these improvements and modifications shall fall within the scope of the present disclosure.

What is claimed is:

1. A see-through display device, comprising a light guide plate and an array substrate which are oppositely arranged, and a liquid crystal dimming layer arranged between the light guide plate and the array substrate, wherein the see-through display device further comprises:

a collimated light source assembly, arranged on a light incident surface of the light guide plate, and configured to form collimated light and control a light emitting direction such that a light ray incident into the light guide plate is transmitted in a total reflection manner;

a first light extraction layer, arranged on a first surface, adjacent to the light incident surface, of the light guide plate, wherein the first light extraction layer is provided with a plurality of light extraction outlets, and is configured to extract, in a collimated manner, the light ray transmitted inside the light guide plate through the light extraction outlets;

an extinction layer and a second light extraction layer, wherein the extinction layer and the second light extraction layer are sequentially superposed on one surface, facing the first surface of the light guide plate, of the array substrate along a direction towards the light guide plate, the extinction layer comprises a light guide region and a light absorption region which are arranged alternately, the second light extraction layer comprises a plurality of light extraction inlets, and an orthographic projection of the light extraction inlets onto the extinction layer is within the light guide region such that a light ray entering from the light extraction inlets is incident to the light guide region and transmitted to the light absorption region in a total reflection manner within the light guide region; and a reflecting layer, arranged on a side, close to the light guide plate, of the second light extraction layer, comprising a plurality of reflecting portions each located between two adjacent light extraction inlets of the plurality of light extraction inlets, and configured to reflect collimated light extracted from the light extraction outlets to the light guide plate to exit from a second surface of the light guide plate, wherein the second surface is arranged opposite to the first surface;

wherein the liquid crystal dimming layer comprises a first electrode and a second electrode which are oppositely arranged, and a liquid crystal layer arranged between the first electrode and the second electrode, in a first state, a voltage is applied to the first electrode and the second electrode, and the light ray exiting from the light extraction outlets is deflected by the liquid crystal layer and incident to the reflecting layer; and in a second state, no voltage is applied to the first electrode and the second electrode, and the light ray exiting from the light extraction outlets passes through the liquid crystal layer and then enters the extinction layer from the light extraction inlets.

2. The see-through display device according to claim 1, wherein a reflecting surface, facing the light guide plate, of each of the reflecting portions is an inclined surface, and the inclined surface forms an acute angle with the first surface of the light guide plate.

3. The see-through display device according to claim 2, wherein each of the reflecting portions comprises:

a wedge-shaped connecting piece formed by photoresist, wherein the wedge-shaped connecting piece comprises a first connecting surface connected to the second light extraction layer and a second connecting surface adjacent to the first connecting surface, and the second connecting surface is the inclined surface forming the acute angle with the first surface of the light guide plate; and a metal reflecting piece arranged on the second connecting surface, wherein a surface, away from the second connecting surface, of the metal reflecting piece is parallel to the second connecting surface.

4. The see-through display device according to claim 1, wherein a surface, facing the array substrate, of the first light extraction layer is coated with a scattering particle layer.

5. The see-through display device according to claim 4, wherein the scattering particle layer comprises a plurality of scattering particle portions each located between two adjacent light extraction outlets of the light extraction outlets, the plurality of the scattering particle portions correspond to the plurality of the reflecting portions in a one-to-one manner, and each of the scattering particle portions is located in a transmission path of a light ray reflected by the corresponding reflecting portion.

6. The see-through display device according to claim 1, wherein a refractive index of the second light extraction layer is less than a refractive index of the light guide region of the extinction layer.

7. The see-through display device according to claim 1, wherein the light guide region of the extinction layer is made of a material with a same refractive index as a refractive index of the light guide plate.

8. The see-through display device according to claim 1, wherein a refractive index of the first light extraction layer is less than a refractive index of the light guide plate.

9. The see-through display device according to claim 1, wherein the collimated light source assembly comprises a collimating lampshade and a light source located in the collimating lampshade, the collimating lampshade comprises a light emitting surface connected to and parallel to the light incident surface of the light guide plate and a curved reflecting surface arranged opposite to the light emitting surface, and the light source is located at a focal point of the curved reflecting surface.

10. A manufacturing method of the see-through display device according to claim 1, comprising forming a reflecting layer, wherein the forming the reflecting layer specifically comprises:
    performing multiple exposures to form a stepped surface and then performing a development process by using a mask, to form a plurality of wedge-shaped connecting pieces; and
    depositing a metal layer on a second connecting surface of each of the wedge-shaped connecting pieces through a magnetron sputtering process, to form a metal reflecting piece.

* * * * *